United States Patent [19]

Furuyama

[11] Patent Number: 4,847,708

[45] Date of Patent: Jul. 11, 1989

[54] METHOD AND APPARATUS FOR AUTOMATICALLY SEARCHING DESIRED TRACK POSITION OR RECORDING REGION ON INFORMATION RECORDING MEDIUM

[75] Inventor: Hiroaki Furuyama, Higashiyamato, Japan

[73] Assignee: Teac Corporation, Musashino, Japan

[21] Appl. No.: 48,019

[22] Filed: May 7, 1987

[30] Foreign Application Priority Data

May 12, 1986 [JP] Japan .................................. 61-107865
Jul. 3, 1986 [JP] Japan .................................. 61-156783
Jul. 14, 1986 [JP] Japan .................................. 61-165221

[51] Int. Cl.$^4$ ............................................. G11B 12/04
[52] U.S. Cl. ......................................... 369/32; 360/60; 360/72.1; 360/78.04; 360/69; 362/54
[58] Field of Search ..................... 360/72.1, 75, 78, 69, 360/74.4, 60; 369/47, 50, 53, 54, 58

[56] References Cited

U.S. PATENT DOCUMENTS 4,689,778  8/1987  Miura ................................. 360/78 X

FOREIGN PATENT DOCUMENTS

54-140515  10/1979  Japan .

Primary Examiner—A. J. Heinz
Attorney, Agent, or Firm—Ladas & Parry

[57] ABSTRACT

A method and apparatus for automatically searching a desired track position or one or a plurality of recording regions on an information recording medium which comprises pre-recorded tracks pre-recorded with an information signal and unrecorded tracks. The search is carried out based on the existence and non-existence of a reproduced radio frequency (RF) signal which is reproduced from the information recording medium.

11 Claims, 8 Drawing Sheets

METHOD AND APPARATUS FOR AUTOMATICALLY SEARCHING DESIRED TRACK POSITION OR RECORDING REGION ON INFORMATION RECORDING MEDIUM

BACKGROUND OF THE INVENTION

The present invention generally relates to methods and apparatus for searching a desired track position or recording region on an information recording medium, and more particularly to a method and apparatus for automatically searching a desired track position or recording region on an information recording medium which comprises pre-recorded tracks and unrecorded tracks based on the existence and non-existence of a reproduced radio frequency (RF) signal reproduced from the information recording medium.

Information recording discs, especially video discs, are recorded with information signals from an inner peripheral position to an outer peripheral position of a recording region, for example, on a continuous pre-recorded track or consecutive pre-recorded tracks. However, among recordable discs, there are discs having the recording region thereof divided into a plurality of recording sections which are allocated for predetermined kinds of information signals such as a video signal. In such discs, the pre-recorded track is not continuous and the successive pre-recorded tracks have discontinuities. In other words, pre-recorded tracks and unrecorded tracks coexist in the recording region of such discs.

When playing the disc having the pre-recorded tracks and the unrecorded tracks formed at random in the recording region, there are cases where the user wishes to search for a starting track position of a first group of unrecorded tracks which occurs after a pre-recorded track which is being scanned in a reproduction mode, and cases where the user wishes to search for a starting position of a first group of pre-recorded tracks which occurs after an unrecorded track which is being scanned in a recording mode.

However, the search for the starting track position of an arbitrary group of tracks is difficult to carry out without an address information. For this reason, such a search is conventionally carried out by playing the disc in a normal reproduction mode and manually stopping the feeding of a reproducing means when the state of the reproduced signal changes. In other words, the user must monitor a reproduced picture on a monitoring display in the normal reproduction mode and manually stop the feeding of the reproducing means when the state of the reproduced picture changes. For example, when the user wishes to search for the starting track position of the first group of unrecorded tracks which occurs after the pre-recorded track which is being scanned in the normal reproduction mode, the user stops the feeding of the reproducing means when a reproduced picture is no longer obtained on the monitoring display. For this reason, in a case where one pre-recorded track exists within a group of unrecorded tracks or one unrecorded track exists within a group of pre-recorded tracks, for example, there is a problem in that the user may overlook the track position where the state of the reproduced picture changes because the scanning time of one track is extremely short. In addition, there is a big burden on the user because the user must constantly monitor the reproduced picture on the monitoring display while the search is carried out.

On the other hand, when recording a video signal amounting to a predetermined number of frames on the disc having the pre-recorded tracks and the unrecorded tracks formed at random in the recording region, it is necessary to search the existing position of a group of unrecorded tracks comprising a number of unrecorded tracks sufficient for recording the video signal amounting to the predetermined number of frames. In this case, the user may use a table or the like which contains frame numbers of pre-recorded tracks and unrecorded tracks when searching for the group of unrecorded tracks comprising the sufficient number of unrecorded tracks.

However, when there is no table containing such information, the user must search for the group of unrecorded tracks while monitoring the reproduced picture on the monitoring display, and the user must also discriminate whether or not the searched group of unrecorded tracks comprises a number of unrecorded tracks sufficient for recording the video signal amounting to the predetermined number of frames. Hence, there are problems in that the operation of searching for the group of unrecorded tracks and the operation of discriminating whether or not the searched group of unrecorded tracks comprises the sufficient number of unrecorded tracks are extremely difficult and troublesome to carry out.

In addition, in a case where the user wishes to record a video signal amounting to such a large number of frames on the disc having the pre-recorded tracks and the unrecorded tracks formed at random in the recording region that the video signal cannot be recorded within one group of unrecorded tracks, it is necessary to record the video signal in a plurality of groups of unrecorded tracks located at independent parts of the recording region on the disc. Furthermore, there is a case where the video signal should be recorded in different recording modes in each of the plurality of groups of unrecorded tracks. For example, when the video signal relates to an opening flower, it is desirable to observe the movements of the petals at a high speed, and the recording of the video signal is carried out in an interval recording mode in one group of unrecorded tracks. In the interval recording mode, the recording is carried out at predetermined intervals. On the other hand, the recording need not be carried out in sequence from the group of unrecorded tracks located in the inner peripheral part of the recording region to the group of unrecorded track located in the outer peripheral part of the recording region, and the sequence may be arbitrary.

Accordingly, it is desirable that a program recording can be carried out in which a plurality of groups of unrecorded tracks are set by manipulating a remote control key and the information signal such as the video signal is continuously and automatically recorded on the groups of unrecorded tracks in the set sequence.

However, it is necessary to prevent a duplex recording in which the information signal is erroneously recorded on a pre-recorded track which is pre-recorded with another information signal, since the other information signal will be erased by the new recording on the pre-recorded track. It is essential that the duplex recording is prevented in a type of information recording medium which can be recorded only once with an information signal, because the signal recorded on the pre-recorded track of this type of information recording medium cannot be erased. In other words, if the information signal is newly recorded on the pre-recorded track which is recorded with the previously recorded information signal, both the previously recorded information signal and the newly recorded information signal will be destroyed and neither the previously recorded information signal nor the newly recorded information signal can be reproduced at the time of a reproduction.

The present applicant has thus proposed a method and apparatus for preventing duplex recording on the information recording medium in a United States patent application Ser. No. 040,946 entitled "METHOD AND APPARATUS FOR PREVENTING DUPLEX RECORDING ON INFORMATION RECORDING MEDIUM" filed on Apr. 21, 1987 (U.S. Pat. No. 4,794,582) based on a Japanese Patent Application No. 94641/1986, so as to accurately discriminate the unrecorded tracks and the pre-recorded tracks and positively prevent the erroneous recording of the information signal on the pre-recorded tracks.

According to this previously proposed method and apparatus, an unrecorded track having a starting address where a recording is to be started is detected, a first pre-recorded track occurring after the unrecorded track is detected, an address of the first pre-recorded track is confirmed by reproducing address signals from vicinities of the first pre-recorded track, an information signal is recorded on unrecorded tracks occurring after the unrecorded track having the starting address, and the recording of the information signal is forcibly stopped at an unrecorded track having an address which is one less than the address of the first pre-recorded track.

The user makes a program (records the information signal) by referring to the table which identifies the unrecorded tracks on the disc which is played when carrying out the program recording described before, but there may be errors in the table and errors in the programming itself. When such errors exist, the user may be trying to record the information signal on the pre-recorded track.

According to the previously proposed method and apparatus, the recording of the information signal is forcibly stopped in the case where the user is trying erroneously to record the information signal on the pre-recorded track, and the program recording is ended at the halfway point. However, the forced stopping of the program recording is undesirable in this case because the original intent of the program recording is to record the information signal on the plurality of groups of unrecorded tracks as described before. In other words, the original intent of the program recording cannot be realized unless the program recording is carried out to the end.

SUMMARY OF THE INVENTION

Accordingly, it is a general object of the present invention to provide a novel and useful method and apparatus for automatically searching a desired track position or recording region on information recording medium comprising pre-recorded tracks and unrecorded tracks based on the existence and non-existence of a reproduced radio frequency (RF) signal reproduced from the information recording medium, in which the problems described heretofore are eliminated.

Another and more specific object of the present invention is to provide a method and apparatus for automatically searching a desired track position on an information recording medium comprising pre-recorded tracks and unrecorded tracks based on the existence and non-existence of a reproduced radio frequency (RF) signal reproduced from the information recording medium, wherein reproducing means for scanning the information recording medium is successively fed responsive to a track position search instruction by one track in a direction in accordance with the track position search instruction, the existence and non-existence of the reproduced RF signal is detected for each track, and the feeding of the reproducing means is stopped at a first track position where the existence state of the reproduced RF signal (that is, whether or not the reproduced RF signal exists) changes from the existence state of the reproduced RF signal for the track which is scanned by the reproducing means at a time when the track position search instruction is entered. This first track is scanned repeatedly by the reproducing means.

According to the method and apparatus of the present invention, it is possible to automatically detect the first track position where the existence state of the reproduced RF signal changes from the existence state of the reproduced RF signal for the track which is scanned by the reproducing means at the time when the track position search instruction is entered, by manipulating a single key or entering a single command. For this reason, the operation required to carry out the search is extremely simple, and there is virtually no burden on the user because there is no need for the user to constantly monitor a reproduced picture on a monitoring display while carrying out the search. In addition, when playing in the reproduction mode an information recording medium on which the groups of pre-recorded tracks are formed at random, it is possible to quickly search the starting track position of the next group of pre-recorded tracks by skipping the group of unrecorded tracks preceding the next group of pre-recorded tracks. Moreover, since the operation mode is set to a still (or stop) reproduction mode in which the same track is scanned repeatedly when the search is completed, it is possible to positively search for a pre-recorded track even when the pre-recorded track is an independent track pre-recorded with a video signal related to a still picture. Furthermore, it is possible to quickly and positively detect the starting track position of a group of unrecorded tracks adjacent to a group of pre-recorded tracks.

Still another object of the present invention is to provide a method and apparatus for automatically searching a desired recording region on an information recording medium comprising pre-recorded tracks and unrecorded tracks based on the existence and non-existence of a reproduced radio frequency (RF) signal reproduced from the information recording medium, wherein a desired recording interval in which the recording is to be made is stored, reproducing means for scanning the information recording medium is successively fed by one track in a forward direction, the existence and non-existence of the reproduced RF signal from each track is detected, a group of unrecorded tracks comprising a number of unrecorded tracks (from which no reproduced RF signal is obtained) greater than or equal to a number of tracks required to record an information signal amounting to the desired recording interval is detected, the reproducing means is then fed in a reverse direction to search for a starting track position of the detected group of unrecorded tracks, and an address of the starting track position is confirmed by reproducing the address from a pre-recorded track or a guide track.

According to the method and apparatus of the present invention, it is possible to automatically detect the first track position of the group of unrecorded tracks comprising the number of tracks sufficient for recording the information signal amounting to the desired recording interval. As a result, even when the user does not have a table identifying the positions of the pre-recorded tracks and unrecorded tracks on the information recording medium, it is possible to record the information continuously for the desired recording interval.

A further object of the present invention is to provide a method and apparatus for automatically searching desired recording regions on an information recording medium comprising pre-recorded tracks and unrecorded tracks based on the existence and non-existence of a reproduced radio frequency (RF) signal reproduced from the information recording medium, wherein a check is made before a program recording is carried out to confirm that the program recording can be carried out without erroneously recording an information signal on a pre-recorded track.

According to the method and apparatus of the present invention, it is possible to warn the user by a display or the like and prevent the program recording from being carried out in cases where the groups of unrecorded tracks in which the information signal is to be recorded actually contain one or more pre-recorded tracks and the groups of unrecorded tracks actually overlap in part. Since it is possible to know beforehand whether or not the program recording can actually be carried out, a fail-free program recording is ensured.

Other objects and further objects of the present invention will be apparent from the following detailed description when read in conjunction with the accompanying drawings.

DETAILED DESCRIPTION

Figure 1:
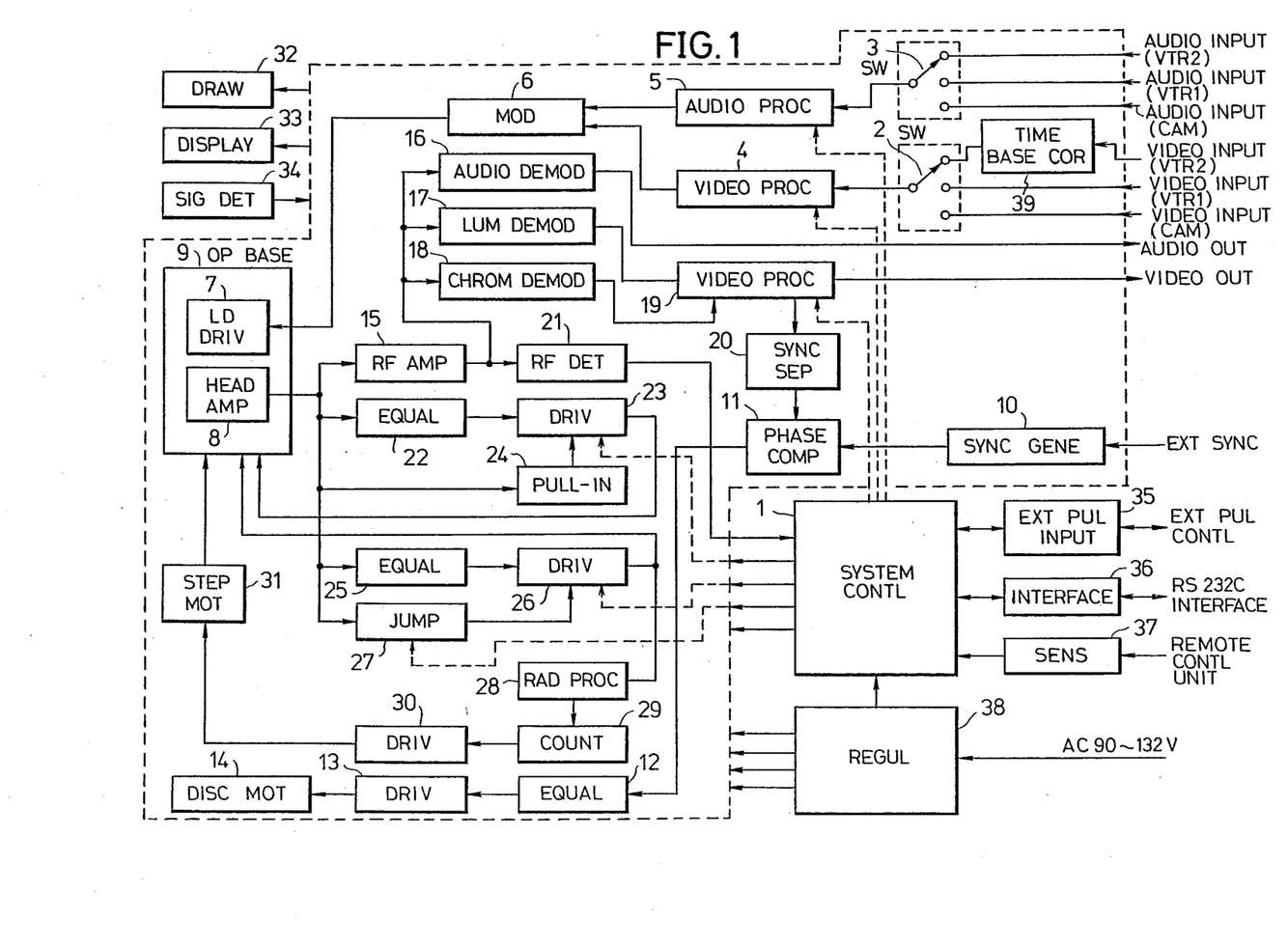
FIG. 1 is a system block diagram showing an embodiment of a disc recording and reproducing apparatus to which the method and apparatus according to the present invention may be applied.
Figure 2:
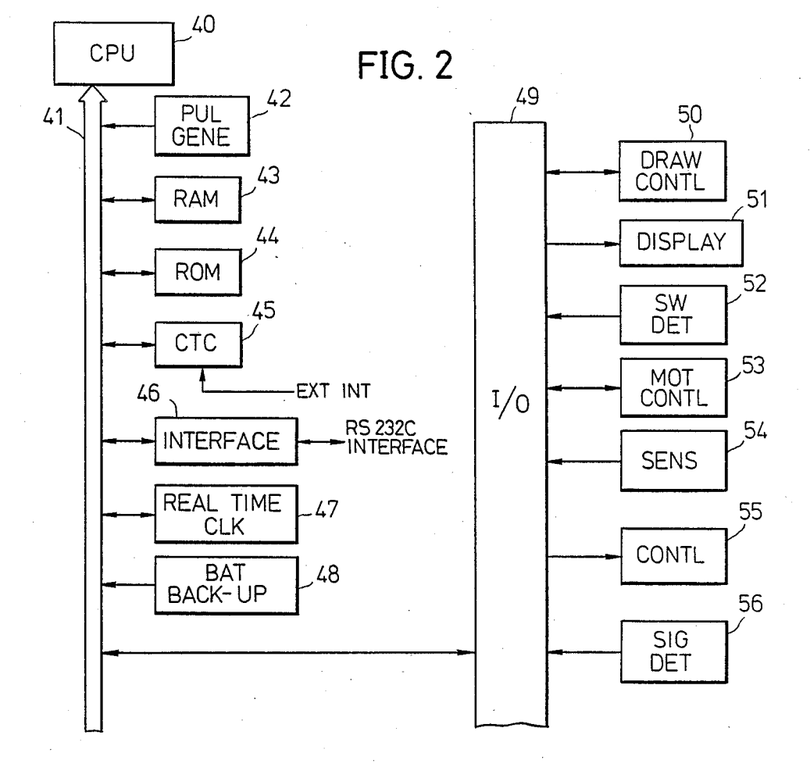
FIG. 2 is a system block diagram showing an embodiment of an essential part of the block system shown in FIG. 1.

FIG. 1 shows an embodiment of a disc recording and reproducing apparatus to which the method and apparatus according to the present invention may be applied. In other words, it may be regarded that FIG. 1 shows an embodiment of the present invention. FIG. 2 shows an embodiment of an essential part including a system controller of the apparatus shown in FIG. 1.

First, a general description will be given on the disc recording and reproducing apparatus to which the present invention may be applied, by referring to FIGS. 1 and 2. In a recording mode, an input video signal is obtained from one of a first video tape recorder VTR1, a second video tape recorder VTR2 and a camera via a time base corrector 39 by selecting a connecting position of a switch 2, and an input audio signal is obtained from a corresponding one of the first video tape recorder VTR1, the second video tape recorder VTR2 and the camera by selecting a connecting position of a switch 3. The input video signal is supplied to a modulator 6 via a video signal processor 4, while the input audio signal is supplied to the modulator via an audio signal processor 5. The processed input video and audio signals are modulated into a signal having a predetermined signal format in the modulator 6. A modulated signal from the modulator 6 is supplied to a laser diode (not shown) via a laser diode (LD) driver 7 so as to control the intensity of light emitted from the laser diode depending on the information contents of the modulated signal. The light from the laser diode is irradiated on an optical disc (not shown) which is used as an example of the information recording medium, to record the modulated signal on the optical disc.

The optical disc is rotated by a disc motor 14 to undergo a synchronous rotation. The disc motor 14 is controlled by a control signal which is derived from an external synchronizing signal. A circuit comprising a synchronizing signal generator 10, a phase comparator 11, an equalizer 12 and a driver 13 generates the control signal from the external synchronizing signal. The LD driver 7 is mounted on an optical base 9 together with a head amplifier 8, and the optical base 9 is fed in a predetermined direction by a stepping motor 31 in the recording mode.

In a reproduction mode, a reproduced RF signal is obtained by detecting the change in the intensity of light reflected from the optical disc by scanning the optical disc by a main light beam. The reproduced RF signal is passed through the head amplifier 8 and an RF signal amplifier 15. The reproduced RF signal obtained via the RF signal amplifier 15 is supplied to an audio signal demodulator 16, a luminance signal demodulator 17 and a carrier chrominance signal (color signal) demodulator 18. A reproduced luminance signal from the luminance signal demodulator 17 and a reproduced carrier chrominance signal from the carrier chrominance signal demodulator 18 are supplied to a video signal processor 19 wherein the reproduced signals are converted into a reproduced color video signal having a predetermined signal format. A synchronizing signal separator 20 separates a synchronizing signal from a signal which is obtained from the video signal processor 19. The synchronizing signal from the synchronizing signal separator 20 is supplied to the phase comparator 11.

The reproduced RF signal obtained via the RF signal amplifier 15 is supplied to an RF signal detecting circuit 21 which detects the RF signal, and an output detection signal of the RF signal detecting circuit 21 is supplied to a system controller 1. A signal which is obtained by detecting the change in the intensity of light reflected from the optical disc by scanning the optical disc by sub light beams different from the main light beam is also obtained from the head amplifier 8. This signal from the head amplifier 8 is supplied to a focus servo circuit constituted by an equalizer 22, a driver 23 and a pull-in circuit 24. The focus servo circuit produces a focus servo signal for controlling the focus so that the main light beam hits the optical disc in focus, and this focus servo signal is supplied to the optical base 9. The pull-in circuit 24 operates when pulling in the focus servo circuit. In other words, the driver 23 is excited with a predetermined period when the focus servo operation is carried out in a closed loop, and the pull-in circuit 24 is used to detect the peaks in the output of the head amplifier 8 and stop the excitation when carrying out the focus servo in the closed loop.

In the present embodiment, the optical base 9 constitutes a part of an optical recording and reproducing means for recording and reproducing a signal on and from the optical disc by use of the light beams.

The output signal of the head amplifier 8 is also supplied to a tracking servo circuit constituted by an equalizer 25, a driver 26 and a jump circuit 27. The tracking servo circuit produces a tracking error signal which is supplied to the optical base 9 for controlling the tracking. The tracking servo circuit and the focus servo circuit described before are used not only in the reproduction mode but also in the recording mode.

The output signal of the driver 26 is also supplied to the stepping motor 31 via a radial processing circuit 28, a counter 29 and a driver 30, so as to control the rotation of the stepping motor 31. The radial processing circuit 28 drives the stepping motor 31 to move the entire optical base 9 along a radial direction of the optical disc when the output voltage of the driver 26 exceeds a predetermined level. This output voltage of the driver 26 is used to drive a rotary mirror (not shown) of the optical base 9. As a result, the rotary mirror is always controlled about its neutral position.

A drawer part 32 lowers a disc tray (not shown) for the optical disc responsive to a signal from a circuit part indicated by a phantom line in FIG. 1 when the signal detector 34 for detecting various signals detects that the disc tray is closed. The optical disc on the lowered disc tray is placed on a turntable (not shown) and clamped thereon. On the other hand, when the signal detector 34 detects that an eject switch (not shown) is turned ON, the drawer part 32 raises the disc tray responsive to a signal from the circuit part so as to eject the optical disc from the apparatus. Various modes of the apparatus and the like are displayed on a display device 33.

A regulator 38 supplies D.C. power source voltages to various parts (circuit part) of the apparatus indicated by the phantom line in FIG. 1. The system controller 1 is also supplied with signals from an external pulse input part 35, an interface 36 and a sensor 37.

As shown in FIG. 2, the system controller 1 comprises a central processing unit (CPU) 40, and a pulse generator 42, a random access memory (RAM) 43 a read only memory (ROM) 44, a counter timer circuit (CTC) 45, an interface 46 corresponding to the interface 36 shown in FIG. 1, a real time clock 47, a battery back-up 48 and an input/output (I/O) device 49 which are respectively coupled to the CPU 40 via a bus line 41. The pulse generator 42 generates various pulses including system reset pulses and a system clock pulses. The CTC 45 comprises a counter and a timer for generating an interrupt. The real time clock 47 generates calendar clock pulses for the year, month, day, hour, minute and second.

The I/O device 49 is coupled to a drawer controller 50 for controlling the drawer part 32, a display part 51, a switch detector 52, a controller 53 for controlling the stepping motor 31, a remote control sensor 54 corresponding to the sensor 37, a controller 55, and a signal detector 56 which corresponds to the signal detector 34.

In FIG. 2, the drawer controller 50 constitutes a part of the drawer part 32, and the display part 51 constitutes a part of the display device 33 shown in FIG. 1. In addition, the switch detector 52, the remote control sensor 54 and the signal detector 56 constitute a part of the signal detector 34. Other remaining parts shown in FIG. 2 substantially constitute the system controller 1. A known integrated circuit chip Z80 may be used for the CPU 40 shown in FIG. 2.

Figure 3:
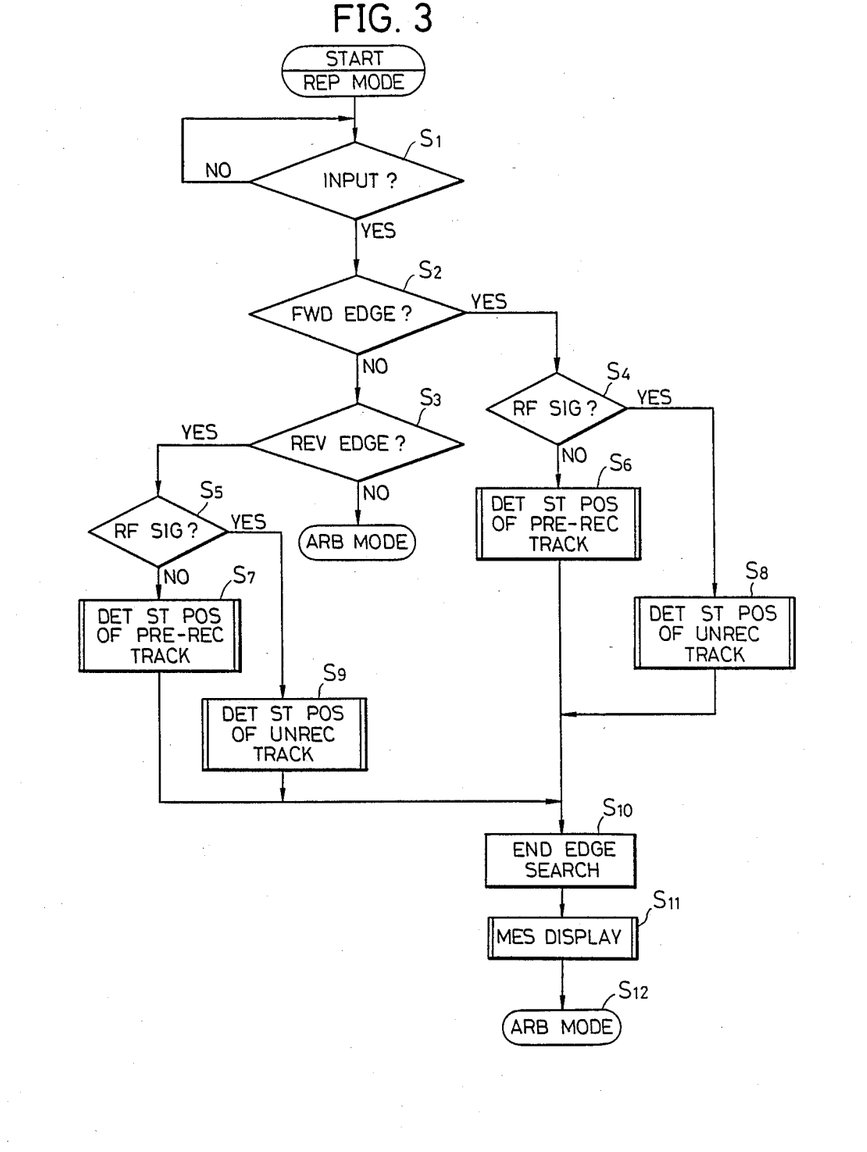
FIG. 3 is a flow chart for explaining a first embodiment of the present invention.

Next, a description will be given of a first embodiment of the present invention. When there is a key input from the remote control key (sensor 37) or a command input from the interface 36 when the disc recording and reproducing apparatus shown in FIG. 1 is in the reproduction mode, the system controller 1 carries out an operation shown in FIG. 3. In FIG. 3, a step S1 detects whether or not the command input (or key input) is entered from the interface 36 (or the remote control key). When the discrimination result in the step S1 becomes YES, a step S2 discriminates whether or not the command input (or key input) instructs a search for an edge in a forward direction, that is, a search for a track at a border of an unrecorded track and a pre-recorded track. When the discrimination result in the step S2 is NO, a step S3 discriminates whether or not the command input (or key input) instructs a search for an edge in a reverse direction. In the present specification, the forward direction refers to a direction which is identical to a scanning direction of the recording and reproducing means in the normal reproduction mode at a time when the command input (or key input) is entered, and the reverse direction refers to a direction opposite to the above scanning direction in the normal reproduction mode.

A step S4 discriminates whether or not a reproduced RF signal (normally, an FM signal) is obtained from the recording and reproducing means when the discrimination result in the step S2 is YES. Similarly, a step S5 discriminates whether or not a reproduced RF signal is obtained from the recording and reproducing means when the discrimination result in the step S3 is YES. The discrimination on whether or not the reproduced RF signal is obtained is carried out based on the output detection signal of the RF signal detecting circuit 21 which detects the envelope of the reproduced signal obtained from the recording and reproducing means.

When the discrimination result in the step S4 or S5 is NO, the recording and reproducing means is presently scanning an unrecorded track. Thus, in this base, a step S6 or S7 is carried out to search and detect the starting position of a pre-recorded track. On the other hand, when the discrimination result in the step S4 or S5 is YES, the recording and reproducing means is presently scanning a pre-recorded track. Hence, in this case, a step S8 or S9 is carried out to search and detect the starting position of an unrecorded track.

A step S10 ends the edge searching operation and sets the operation mode of the apparatus to the still reproduction mode when the search for the starting position of the pre-recorded track or unrecorded track is ended. A step S11 displays messages such as a message indicating that the edge searching operation is ended. When the edge search operation is ended, the operation mode of the apparatus may be set to an arbitrary mode. However, in order to positively search the pre-recorded (or unrecorded) track even when only one pre-recorded (or unrecorded) track exists, it is preferable to set the operation mode of the apparatus to the still reproduction mode when the edge searching operation is ended. In other words, there is no possibility of missing the intended pre-recorded (or unrecorded) track because the same track turn is scanned repeatedly in the still reproduction mode. After the step S11, a step S12 advances the operation to processes related to other operation modes. When the discrimination result in the step S3 is NO, a step S13 advances the operation to processes related to an arbitrary operation mode.

Figure 4:
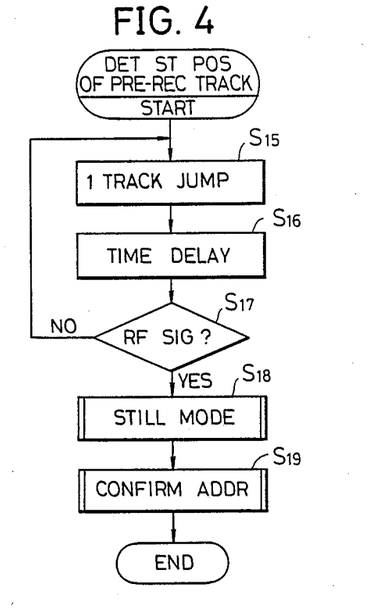
FIGS. 4 and 5 are flow charts for explaining embodiments of essential parts of the flow chart shown in FIG. 3.

Next, a more detailed description will be given on the operation of searching for the starting position of the intended pre-recorded or unrecorded track in the steps S6 through S9. FIG. 4 shows an embodiment of a routine which is carried out to detect the starting position of the pre-recorded track in the steps S6 and S7 shown in FIG. 3. When the routine shown in FIG. 4 is started, a step S15 causes the recording and reproducing means to jump one track pitch from a present track to scan the next track. A step S16 provides a time delay of an extremely short time which is required for the circuit operation of the RF signal detecting circuit 21 and the like to stabilize. A step S17 discriminates whether or not a reproduced RF signal is obtained from the next track which is scanned after the jump. When the discrimination result in the step S17 is NO, the next track which is scanned is an unrecorded track, and the operation is returned to the step S15. The steps S15 through S17 are repeated until the discrimination result in the step S17 becomes YES.

In the case of the step S6 shown in FIG. 3, the track jump in the step S15 is carried out in the forward direction responsive to the forward edge searching operation detected in the step S2. On the other hand, the track jump in the step S15 is carried out in the reverse direction responsive to the reverse edge searching operation detected in the step S3 in the case of the step S7 shown in FIG. 3. When the first pre-recorded track after the group of unrecorded tracks is detected, a step S18 sets the operation mode of the apparatus to the still reproduction mode so as to repeatedly scan the first pre-recorded track. A step S19 confirms the address of the first pre-recorded track by detecting and reproducing an address signal from the first pre-recorded track.

Figure 6:
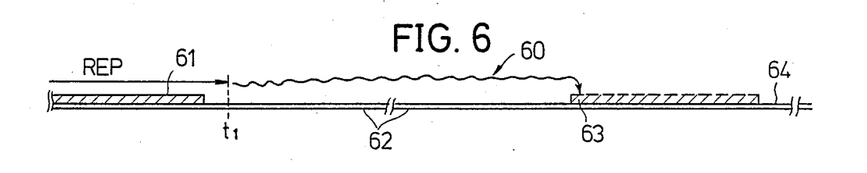
FIGS. 6 and 7 are diagrams for explaining the operation of the first embodiment.

It will now be assumed that the recording and reproducing means scans tracks of a disc 60 shown in FIG. 6 from the inner periphery to the outer periphery of the disc 60 in the normal reproduction mode, for example. When a key input or a command input is made to search the edge in the forward direction at a time t1 when the recording and reproducing means is scanning an unrecorded track within an unrecorded track group 62 which is adjacent to a pre-recorded track group 61, the recording and reproducing means successively jumps one track pitch in the forward direction. The recording and reproducing means stops at a first pre-recorded track 63 within a next pre-recorded track group, and repeatedly scans the first pre-recorded track 63.

Accordingly, even when the user does not know where the information signal which is to be reproduced is pre-recorded on the disc 60, it is possible to automatically and accurately search the next pre-recorded track and easily reproduce the information signal pre-recorded on the next pre-recorded track. Even in a case where the pre-recorded track 63 is a single pre-recorded track provided between the two unrecorded track groups 62 and 64, it is possible to accurately search and detect the single pre-recorded track 63.

Figure 5:
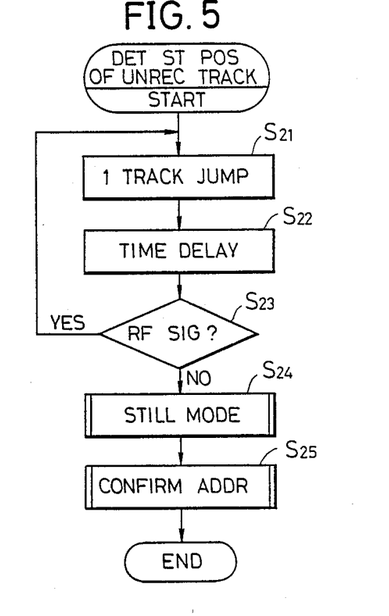

FIG. 5 shows an embodiment of a routine which is carried out to detect the starting position of the unrecorded track in the steps S8 and S9 shown in FIG. 3. When the routine shown in FIG. 5 is started, a step S21 causes the recording and reproducing means to jump one track pitch from a present track to scan the next track. A step S22 provides a time delay of an extremely short time which is required for the circuit operation of the RF signal detecting circuit 21 and the like to stabilize. A step S23 discriminates whether or not a reproduced RF signal is obtained from the next track which is scanned after the jump. When the discrimination result in the step S23 is YES, the next track which is scanned is a pre-corded track, and the operation is returned to the step S21. The steps S21 through S23 are repeated until the discrimination result in the step S23 becomes NO.

In the case of the step S8 shown in FIG. 3, the track jump in the step S21 is carried out in the forward direction responsive to the forward edge searching operation detected in step S2. On the other hand, the track jump in the step S21 is carried out in the reverse direction responsive to the reverse edge searching operation detected in the step S3 in the case of the step S9 shown in FIG. 3. When the first unrecorded track after the group of pre-recorded tracks is detected, a step S24 sets the operation mode of the apparatus to the still reproduction mode so as to repeatedly scan the first unrecorded track. A step S25 confirms the address of the first unrecorded track by detecting and reproducing an address signal from the first unrecorded track.

Figure 7:
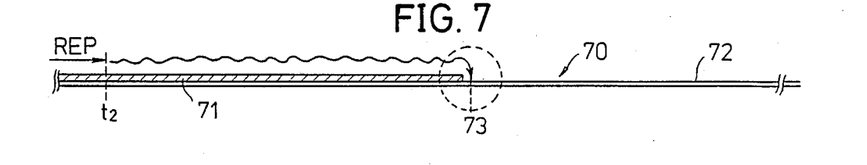

It will now be assumed that the recording and reproducing means scans tracks of a disc 70 shown in FIG. 7 from the inner periphery to the outer periphery of the disc 70 in the normal reproduction mode, for example. When a key input or a command input is made to search the edge in the forward direction at a time t2 when the recording and reproducing means is scanning a pre-recorded track within a pre-recorded track group 71, the recording and reproducing means successively jumps one track pitch in the forward direction. The recording and reproducing means stops at a first unrecorded track 73 within a next unrecorded track group 72, and repeatedly scans the first unrecorded track 73.

Accordingly, even when the user does not know where the unrecorded tracks exist on the disc 60, it is possible to automatically and accurately search the next unrecorded track which occurs after the pre-recorded track which is being scanned responsive to a key input or a command input, and easily start the recording of the information signal from the next unrecorded track.

Next, a description will be given on a second embodiment of the invention. In the present embodiment, it will be assumed for convenience' sake that the optical disc which is rotated by the disc motor 14 shown in FIG. 1 is provided with a guide track (pre-formed pits) as in the case of the disc previously proposed in a U.S. patent application Ser. No. 873,407 filed June 12, 1986 (Pat. No. 4,803,677) in which the assignee is the same as the assignee of the present application. In addition, it will be assumed that the optical disc is recorded with an address signal between the pre-formed pits as previously proposed in a U.S. patent application Ser. No. 917,188 filed Oct. 9, 1986 (Pat. No. 4,802,159) in which the assignee in the same as the assignee of the present application.

In other words, a recording surface of the optical disc is divided into a plurality of imaginary equiangular sectoral regions, and a guide track comprising a spiral track or concentric tracks is formed on the recording surface so that each track turn of the guide track is constituted by a row of pits formed in every other of the equiangular sectoral regions, and the pit is only formed in one of two mutually adjacent track turns of the guide track in each of the equiangular sectoral regions so that the pits are formed in every other track turns of the guide track in a radial direction of the disc in each of the equiangular sectoral regions. An intermediate part between center lines of the two mutually adjacent track turns of the guide track is used for forming an information signal recording track for an information signal at the time of a recording.

Figure 8:
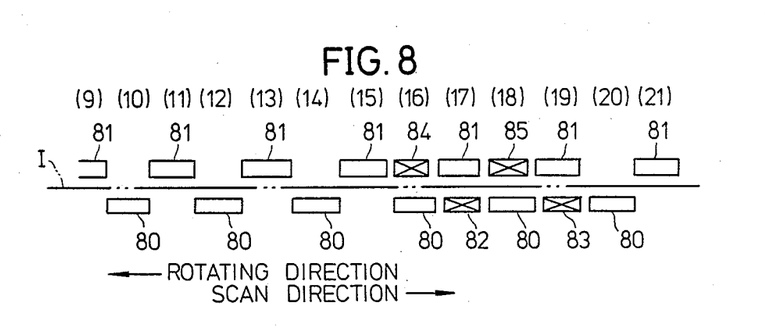
FIG. 8 is a diagram for explaining the recording position of an address signal on a disc which may be used in the present invention.

In FIG. 8, a two-dot chain line I indicates a center line of an information signal recording track formed on the CAV (Constant Angular Velocity) system optical disc which is to be rotated at a constant angular velocity. Pre-formed pits 80 of a track turn of the guide track are formed for every other 1H (one horizontal scanning period) on the lower side of the two-dot chain line I (that is, inner peripheral side of the disc), and pre-formed pits 81 of a track turn of the guide track are formed for every other 1H on the upper side or the two-dot chain line I (that is, outer peripheral side of the disc). The optical disc comprises a recording surface which is divided into a plurality of equiangular sectoral regions and a guide track formed on the recording surface, where each track turn of the guide track is constituted by a row of intermittent pits 80 (or 81) formed in every other equiangular sectoral regions, and the pit 80 (or 81) is only formed in one of two mutually adjacent track turns of the guide track in each equiangular sectoral region so that the pits 80 (or 81) are formed in every other track turns in a radial direction of the optical disc in each equiangular sectoral region.

In FIG. 8, portions 82 through 85 indicated with an "X" mark indicate recording portions where an address signal is pre-recorded. In the track turn of the guide track on the inner peripheral side of the optical disc, the recording portions 82 and 83 are respectively arranged between two pits 80. Similarly, in the track turn of the guide track on the outer peripheral side of the optical disc, the recording portions 84 and 85 are respectively arranged between two pits 81. In other words, address signals containing identical address information are pre-recorded at two positions in each track turn of the guide track when the optical disc is produced, so as to enable an address error checking. The address signals recorded in the recording portions 82 through 85 are respectively constituted by digital data having a predetermined signal format. The address signal is modulated according to a predetermined modulation system such as the phase encoding (PE) before being recorded on the optical disc.

The recording portions 82 through 85 are scanned by sub light beams of the optical recording and reproducing means to reproduce the address signals when recording the information signal on the optical disc. The disc motor 14 and the rotational phase of the optical disc are controlled responsive to an error voltage which is obtained by comparing the phase of a pulse signal which rises in synchronism with an edge of the address signal first reproduced from the recording portion 84 and the phase of a pulse signal which is produced from a frame pulse signal. The information signal is recorded at the position indicated by the two-dot chain line at the rate of two fields (that is, one frame) per one revolution of the optical disc by the main light beam of the optical recording and reproducing means. The numbers in brackets in FIG. 8 indicate scanning line numbers of a composite video signal within the information signal.

Since the recording portions 82 and 83 (or 84 and 85) are recorded with the address signals which indicate the track number of the information signal recording track indicated by the two-dot chain line I in FIG. 8, identical address signals are reproduced two times in one revolution of the optical disc. The track number also indicates a frame number, and the track number is also referred to as a frame address for this reason.

Next, the operation of the present embodiment will be described in conjunction with FIG. 9. When there is a key input from the remote control key (sensor 37) or a command input from the interface 36, the system controller shown in FIG. 1 carries out a routine shown in FIG. 9 for detecting an unrecorded part on the optical disc. A step S31 detects whether or not the disc recording and reproducing apparatus is in the reproduction mode. When the discrimination result in the step S31 is NO, a step S32 sets the operation mode of the apparatus to the reproduction mode after the optical disc on which the recording is to be made is loaded into the apparatus.

When the discrimination result in the step S31 is YES, a step S33 discriminates whether or not the optical base 9 (recording and reproducing means) is moved to the starting track position of a desired recording area (region) in which the recording is to be made, based on a result of the comparison between a reproduced address signal and an input frame address which is entered by the user. When the discrimination result in the step S33 is NO, a step S34 moves the optical base 9 toward the starting track position of the desired recording area in an arbitrary operation mode of the apparatus, and the operation is returned to the step S33.

Figure 11A:
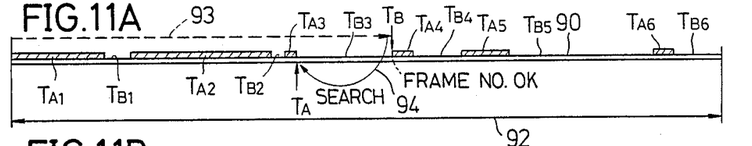
FIGS. 11A and 11B are diagrams for explaining the operation of the second embodiment.
Figure 11B:
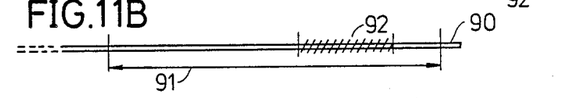

FIGS. 11A and 11B show the recording region of an optical disc 90 which may be used in the present embodiment. Out of a total user's area 91 on the disc 90 shown in FIG. 11B, the search for the desired recording area is carried out within an area 92 which is only a portion of the total user's area 91. As shown in FIG. 11A, the area 92 includes pre-recorded track groups $T_{A1}$, $T_{A2}$, $T_{A3}$, $T_{A4}$, $T_{A5}$ and $T_{A6}$ from the inner periphery to the outer periphery of the disc 90, and unrecorded track groups $T_{B1}$, $T_{B2}$, $T_{B3}$, $T_{B4}$ and $T_{B5}$ are provided between two pre-recorded track groups as shown. Furthermore, an unrecorded track group $T_{B6}$ is provided on the outer peripheral side of the pre-recorded track group $T_{A6}$.

When a starting track in the area 92 (that is, a pre-recorded track within the pre-recorded track group $T_{A1}$ in this case) is detected, the CPU 40 within the system controller 1 generates a control signal for putting the disc recording and reproducing apparatus into the still reproduction mode. In this case, the discrimination result in the step S33 shown in FIG. 9 is YES, and a step S35 stores a frame number F into a memory (for example, the RAM 43 shown in FIG. 2) within the system controller 1, where the frame number F is a variable indicating the number of frames of the video signal which is to be recorded.

Figures 9, 10:
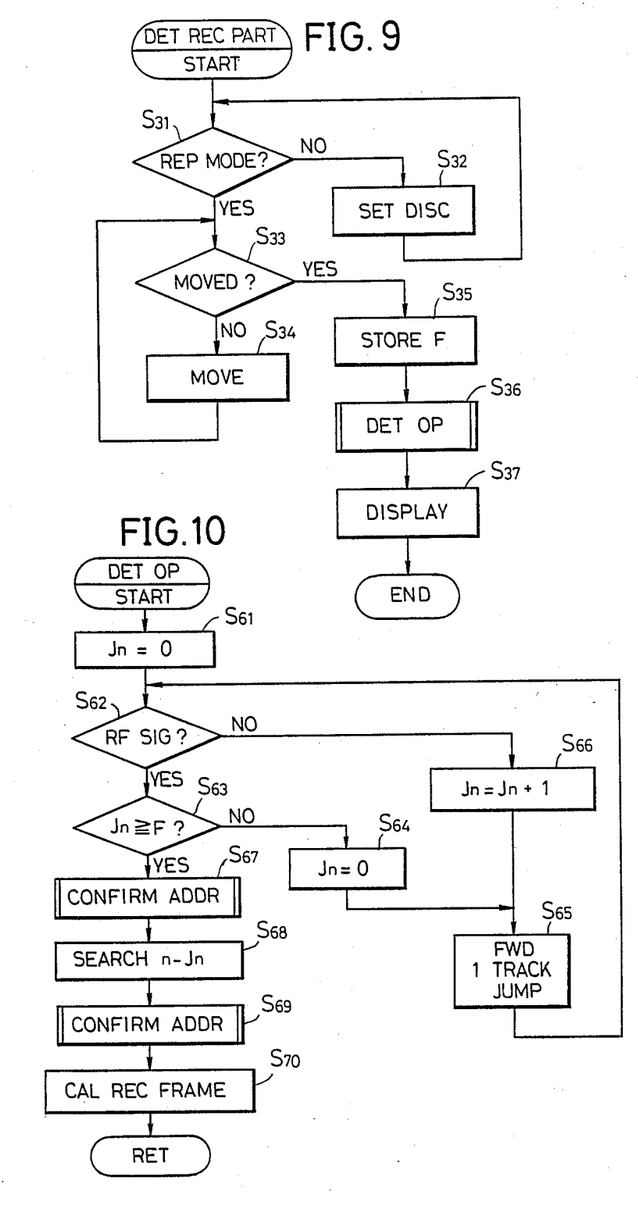
FIG. 9 is a flow chart for explaining a second embodiment of the present invention.
FIG. 10 is a flow chart for explaining an embodiment of an essential part of the flow chart shown in FIG. 9.

A step S36 carries out a detecting operation shown in FIG. 10. In FIG. 10, a step S61 sets a variable $J_n$ in an internal memory of the system controller 1 to "0", and a step S62 discriminates whether or not a reproduced RF signal is detected in the RF signal detecting circuit 21 based on the output detection signal of the RF signal detecting circuit 21. In the case shown in FIG. 11A, the first track in the area 92 is a pre-recorded track, and the discrimination result in the step S62 is YES. Thus, a step S63 discriminates whether or not the variable $J_n$ is greater than or equal to the stored frame number F. At this stage, the variable $J_n$ is still smaller than the frame number F, and the discrimination result in the step S63 is NO. Accordingly, a step S64 sets the variable $J_n$ to "0", and a step S65 causes the recording and reproducing means (light beam) to jump one track pitch in the forward direction (for example, a direction toward the outer periphery of the disc 90) identical to the scanning direction at the time of the recording mode. After the step S65, the operation is returned to the step S62 to discriminate the existence of the reproduced RF signal.

The steps S62 through S65 are repeated while the tracks in the pre-recorded track group $T_{A1}$ are scanned at a high speed, for example. When the recording and reproducing means finishes scanning the pre-recorded track group $T_{A1}$ and reaches a first unrecorded track in the unrecorded track group $T_{B1}$, the discrimination result in the step S62 becomes NO. Hence, a step S66 increments the variable $J_n$ by one, the step S65 causes the recording and reproducing means to jump one track pitch in the forward direction, and the step S62 discriminates the existence of the reproduced RF signal.

Similarly thereafter, the steps S62, S66, S65 and S62 are repeated in this sequence while the recording and reproducing means scans the unrecorded track group $T_{B1}$ at the high speed. When the recording and reproducing means reaches a first pre-recorded track in the pre-recorded track group $T_{A2}$ and the reproduced RF signal is detected in the step S62, the step S63 carries out the discrimination described before. At this stage, the value of the variable $J_n$ is a number obtained by adding "1" to the number of tracks within the unrecorded track group $T_{B1}$. Since one frame is recorded in one track turn, the value of the variable $J_n$ is a number obtained by adding "1" to a recordable number of frames (hereinafter referred to as a recordable frame number). It is assumed for convenience' sake that the variable $J_n$ is still smaller than the frame number F at this stage, and the operation advances to the step S64 described before. Hence, the variable $J_n$ is again set to "0" and the recording and reproducing means jumps one track pitch in the forward direction.

The steps S62 through S65 are repeated while the pre-recorded track group $T_{A2}$ is scanned at the high speed, and the variable $J_n$ is constantly set to "0". The steps S62, S66 and S65 are repeated while the next unrecorded track group $T_{B2}$ is scanned at the high speed. In this case, it is assumed that the variable $J_n$ is still smaller than the frame number F at this stage, and the next pre-recorded track group $T_{A3}$ is scanned at the high speed.

Accordingly, the optical base 9 (recording and reproducing means) is fed toward the outer periphery of the disc 90 as indicated by a phantom line 93 in FIG. 11A, and the unrecorded track group $T_{B3}$ next to the pre-recorded track group $T_{A3}$ is scanned at the high speed. The steps S62, S66 and S65 are repeated while the unrecorded track group $T_{B3}$ is scanned. At a time when the first pre-recorded track $T_B$ in the pre-recorded track group $T_{A4}$ is detected by the detection of the reproduced RF signal from this first pre-recorded track $T_B$, the value of the variable $J_n$ is one greater than the number of tracks (frames recordable) within the unrecorded track group $T_{B3}$, and the operation advances to a step S67 shown in FIG. 10 when variable $J_n$ is greater than or equal to the the frame number F. The step S67 confirms the frame address of the first pre-recorded track in the pre-recorded track group $T_{A4}$.

The reproduced RF signal detected in the step S62 is in theory reproduced from the first pre-recorded track $T_B$ in the pre-recorded track group $T_{A4}$, but there is a possibility that the reproduced RF signal which is detected is actually reproduced from one of the pre-recorded tracks subsequent to the first pre-recorded track $T_B$ in the pre-recorded track group $T_{A4}$ due to signal dropout and the like. On the other hand, in order to prevent a duplex recording on the pre-recorded tracks, a first unrecorded track $T_A$ within the unrecorded track group $T_{B3}$ in which the information signal (video signal) is to be recorded and a last unrecorded track $T_{B-1}$ within the unrecorded track group $T_{B3}$ must be detected with an extremely high accuracy and no detection error should occur.

Accordingly, in the present embodiment, the step S67 confirms the frame address of the first pre-recorded track $T_B$ within the pre-recorded track group $T_{A4}$, by detecting the frame addresses of a predetermined number of tracks in the vicinity of the first pre-recorded track $T_B$ and finding out whether or not the detected frame address of the first pre-recorded track $T_B$ is reliable.

Figure 12:
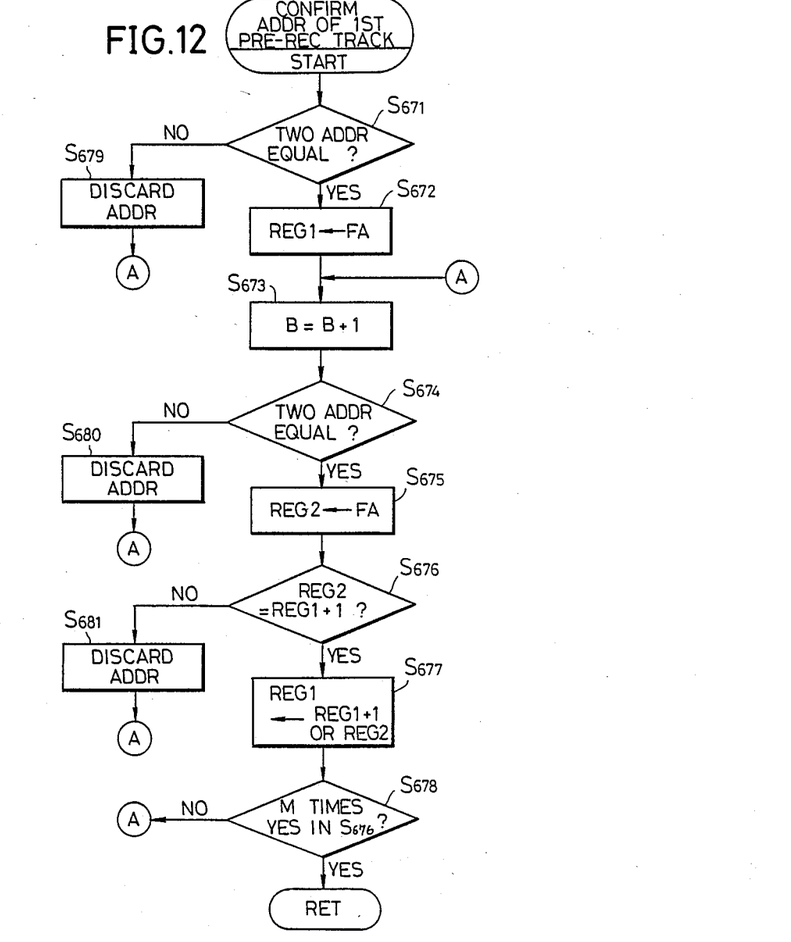
FIG. 12 is a flow chart for explaining an embodiment of an essential part of the flow chart shown in FIG. 9.

A description will now be given on an embodiment of a routine carried out in the step S67 for confirming the frame address of the first pre-recorded track $T_B$, by referring to FIG. 12. In FIG. 12, a step S671 compares the two address signals which are successively reproduced from the first pre-recorded track $T_B$ (or an unrecorded track a few tracks before the first pre-recorded track $T_B$) which occurs after the unrecorded track $T_A$ having the starting address where the recording is to start, and discriminates whether or not the frame address contained in the two reproduced address signals coincide. The two address signals reproduced from the first pre-recorded track $T_B$ should ideally contain the same frame address. When the discrimination result in the step S671 is YES, a step S672 stores an address information FA (for example, a frame address n) contained in the reproduced address signals into a first register REG1 within the system controller 1 shown in FIG. 1. Next, a step S673 produces a control signal which is supplied to the stepping motor 31 for causing the recording and reproducing means to jump one track pitch in the forward direction, that is, increments B by one. In this case, the step S673 produces a control signal for causing the recording and reproducing means to jump to a pre-recorded track $T_{B+1}$ which is adjacent to the first pre-recorded track $T_B$. A step S674 compares the two address signals which are successively reproduced from the pre-recorded track $T_{B+1}$ and discriminates whether or not the frame address contained in the two reproduced address signals coincide. The two address signals reproduced from the pre-recorded track $T_{B+1}$ should ideally contain the same frame address. When the discrimination result in the step S674 is YES, a step S675 stores an address information FA (for example, a frame address n+1) contained in the reproduced address signals into a second register REG2 within the system controller 1 shown in FIG. 1.

Next, a step S676 discriminates whether or not the frame address (n+1) stored in the second register REG2 coincides with a certain frame address which is obtained by incrementing the frame address (n) stored in the first register REG1 by one. When the discrimination result in the step S676 is YES, a step S677 stores the certain frame address (or the frame address (n+1) stored in the second register REG2) into the first register REG1. A step S678 discriminates whether or not discrimination result YES is obtained in the step S676 M times, and the operation advances to a step S68 shown in FIG. 10 when the discrimination result in the step S678 is YES.

On the other hand, when the discrimination result in the step S678 is NO, the operation returns to the step S673 and the steps S673 through S678 are repeated. Accordingly, the second time the steps S673 through S678 are carried out, the step S673 produces a control signal for causing the recording and reproducing means to jump from the pre-recorded track $T_{B+1}$ to a pre-recorded track $T_{B+2}$ which is adjacent to the pre-recorded track $T_{B+1}$. The step S674 compares the two address signals which are successively reproduced from the pre-recorded track $T_{B+2}$ and discriminates whether or not the frame address contained in the two reproduced address signals coincide. When the discrimination result in the step S674 is YES, the step S675 stores an address information FA (for example, a frame address n+2) contained in the reproduced address signals into the second register REG2 within the system controller 1. The step S676 discriminates whether or not the frame address (n+2) stored in the second register REG2 coincides with a certain frame address which is obtained by incrementing the frame address (n+1) stored in the first register REG1 by one. When the discrimination result in the step S676 is YES, the step S677 stores the certain frame address (or the frame address (n+2) stored in the second register REG2) into the first register REG1. The step S678 discriminates whether or not the discrimination result YES is obtained in the step S676 M times.

The steps S673 through S678 are carried out M times, that is, for a predetermined number of pre-recorded tracks, because even when the two frame addresses reproduced from one pre-recorded track coincide, the two frame addresses may coincide by chance due to errors in corresponding bits of the two frame addresses. Thus, it is possible to eliminate the erroneous detection of the coincidence of the two frame addresses from one pre-recorded track.

When the two frame addresses do not coincide in the steps S671, S674 and S676, the frame address is not stored in the registers REG1 and REG2 of the system controller 1, and the reproduced frame address is discarded in corresponding steps S679, S680 and S681. It is discriminated that the frame address n of the first pre-recorded track $T_B$ is reliable only when the two frame addresses reproduced from each of the pre-recorded tracks in the vicinity of the first pre-recorded track $T_B$ coincide M times, where M is preset according to the bit error rate. In this case, the frame address of the last unrecorded track $T_{B-1}$ in the unrecorded track group $T_{B3}$ is n−1. Thereafter, the operation advances to the step S68 shown in FIG. 10 to start a search for the starting address.

The step S68 searches a track having a frame address which is obtained by subtracting the variable $J_n$ from the frame address n which has been confirmed in the step S67. As a result, the optical base 9 is fed as indicated by a solid line 94 in FIG. 11A and reaches the first unrecorded track $T_A$ in the unrecorded track group $T_{B3}$. Next, a step S69 confirms the address of the first unrecorded track $T_A$ for the reasons described before. The step S69 carries out a routine similar to that described before in conjunction with FIG. 12. Thereafter, a step S70 calculates the recordable frame number by subtracting the the frame address of the last unrecorded track $T_{B-1}$ from the frame address of the first unrecorded track $T_A$.

After the detecting operation is carried out in the step S36, a step S37 shown in FIG. 9 displays the starting frame address of the desired recording area and displays the recordable frame number from the starting frame address. The operation of detecting the unrecorded part on the optical disc is then ended after the step S37.

The operation mode of the disc recording and reproducing apparatus is then changed to the recording mode, and the recording of the video signal is started from the unrecorded track $T_A$. The video signal is recorded by use of the main light beam (laser beam), and the address signals are reproduced by use of the sub light beams in real-time from the guide tracks adjacent to the track which is being recorded.

The present embodiment is not limited to the case where the optical disc shown in FIG. 8 is used, and the address signal may be recorded in pits of a guide track formed on the disc or recorded in a groove pre-formed on the disc. It is not essential that the address signal is recorded in the form of pits.

In the case of the CLV (Constant Linear Velocity) system disc which is to be rotated at a constant linear velocity, the address signal is recorded on the pre-recorded tracks by being multiplexed within vertical blanking periods of the video signal, for example. Furthermore, an address signal containing an address information which is incremented by one for each revolution of the disc is recorded in a lead-in region of the disc, for example.

Next, a description will be given on a third embodiment of the present invention, by referring to FIGS.-13A and 13B. When there is a key input from the remote control key (sensor 37) or a command input from the interface 36 shown in FIG. 1, a step S81 shown in FIG. 13A rearranges the sequence of recording areas according to the starting frame address (address of the starting track) thereof, and numbers SP(1) through SP(n) are assigned to the recording areas from the recording area having the smallest starting frame address to the recording area having the largest starting frame address.

Each of the recording areas are the unrecorded track groups in which the information signal is to be recorded. As described before, the user refers to the table identifying the unrecorded tracks when carrying out the program recording, and the starting and ending (first and last) track addresses of each unrecorded track group and the scanning sequence of the unrecorded track groups are entered before the actual program recording is started.

The optical disc which is played in the present embodiment comprises the pre-recorded tracks and the unrecorded tracks which are provided at random. It will be assumed for convenience' sake that a first unrecorded track group has a starting track address "100" and an ending track address "200", a second unrecorded track group has a starting track address "500" and an ending track address "510" and a third unrecorded track group has a starting track address "1000" and an ending track address "2000". Further, it will be assumed that the information signal is to be recorded by the program recording in a recording sequence of the first, third and second unrecorded track groups. In this case, the step S81 numbers the first through third unrecorded track groups independently of the recording sequence, and numbers are assigned to the unrecorded track groups from the unrecorded track group having the smallest starting track address. In other words, the numbers SP(1), SP(2) and SP(3) are respectively assigned to the first, second and third unrecorded track groups.

Figure 13A:
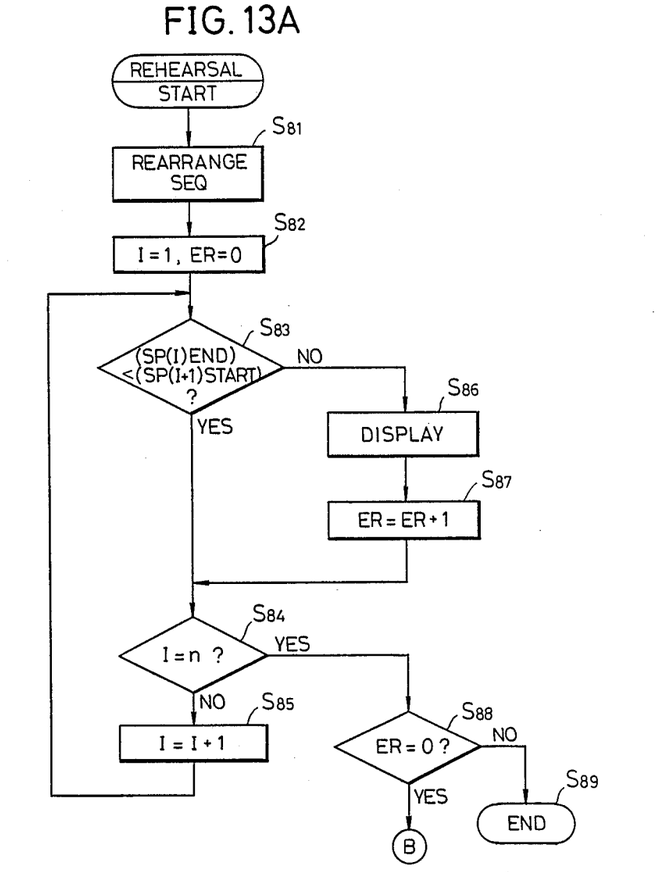
FIGS. 13A and 13B are flow charts for explaining a third embodiment of the present invention.

Thereafter, a step S82 shown in FIG. 13A sets a variable I to "1" and sets a variable ER to an initial value "0". A step S83 discriminates whether or not the ending track address SP(1)END of the first unrecorded track group SP(1) having the smallest starting track address is smaller than the starting track address SP(2)START of the second unrecorded track group SP(2) having the next smallest starting track address.

When the discrimination result in the step S83 is YES, a step S84 discriminates whether or not the variable I is equal to n which indicates the rotal number of unrecorded track groups in which the information signal is to be recorded. At this stage, the value of the variable I is "1" and the variable I is thus smaller than n which is "3" in this case. Accordingly, the discrimination result in the step S84 is NO, and a step S85 increments the variable I by one. The operation is returned to the step S83 after the step S85. Similarly, thereafter, a discrimination to determine whether or not the ending track address SP(I)END of the unrecorded track group having the i-th smallest starting track address is smaller than the starting track address SP(I+1)START of the unrecorded track group having the (i+1)th smallest starting track address, for all of the n unrecorded track groups.

When the ending track address SP(I)END is greater than or equal to the starting track address SP(I+1)START and the discrimination result in the step S83 is NO, there is a partial overlap of the unrecorded track groups SP(I) and SP(I+1). Hence, it is necessary to prevent a duplex recording in this case, and a step S86 is carried out when the discrimination result in the step S83 is NO. The step S86 calculates a number of overlapping tracks by subtracting the starting track address SP(I+1)START from the ending track address SP(I)END to display the number of overlapping tracks, and displays other data such as the recording sequence and the ending track address of the unrecorded track group SP(I) and the recording sequence and starting track address of the unrecorded track group SP(I+1).

After the step S86, a step S87 increments the variable ER by one, and the operation advances to the step S84. After the discrimination in the step S83 is carried out for all of the n unrecorded track groups, the discrimination result in the step S84 becomes YES, and a step S88 discriminates whether or not the variable ER is "0".

When the discrimination result in the step S88 is NO, the operation is ended because there is the partial overlap of the two unrecorded track groups and the duplex recording will be carried out if not ended.

Figure 13B:
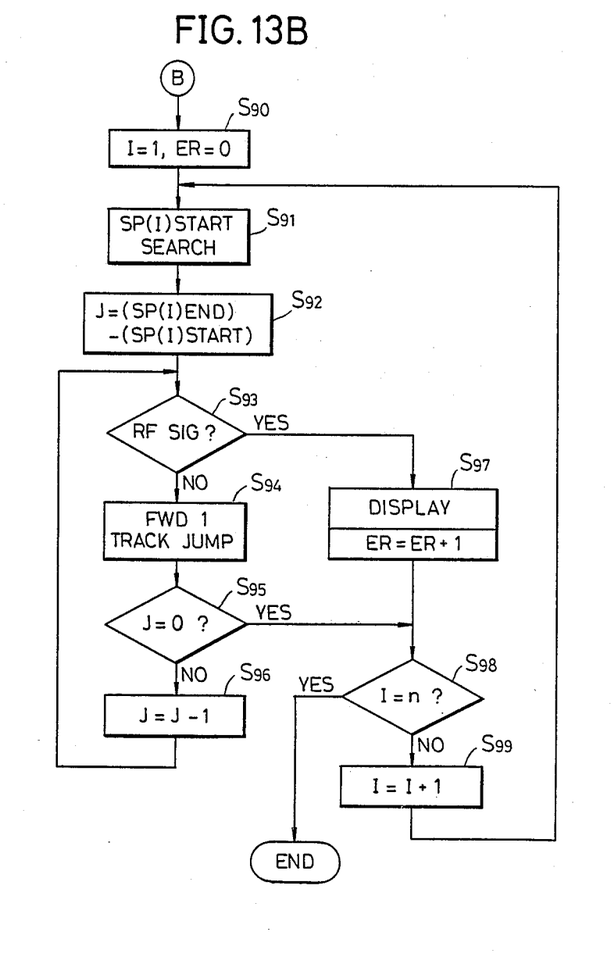

On the other hand, when the discrimination result in the step S88 is YES, the operation advances to a step S90 shown in FIG. 13B. The step S90 sets the variable I to "1" and the variable ER to "0", and a step S91 searches the starting track address of the unrecorded track group SP(1) having the smallest starting track address by moving the recording and reproducing means (optical base 9).

Next, a step S92 calculates a value J by subtracting the starting track address SP(1)START of the unrecorded track group SP(1) from the ending track address SP(1)END of the unrecorded track group SP(1). A step S93 discriminates whether or not a reproduced RF signal is reproduced from the track which is being scanned by the recording and reproducing means, and it is discriminated that the track which is being scanned is an unrecorded track when the discrimination result in the step S93 is NO. A step S94 causes the recording and reproducing means to jump one track pitch in the forward direction when the discrimination result in the step S93 is NO. A step S95 discriminates whether the value J is equal to "0". When the discrimination result in the step S95 is NO, a step S96 decrements the value J by one and the operation is returned to the step S93.

When all of the tracks in the first unrecorded track group SP(I) are scanned at the high speed and the existence of the reproduced RF signal therefrom is discriminated to determine whether or not all of the tracks in the first unrecorded track group SP(1) are indeed unrecorded tracks by carrying out the steps S93 through S96, the discrimination result in the step S95 becomes YES and the operation advances to a step S98.

On the other hand, when there actually is one or more pre-recorded tracks in the first unrecorded track group SP(1) and the discrimination result in the step S93 is YES, a duplex recording will be carried out when the program recording is started. Hence, when the discrimination result in the step S93 is YES, a step S97 displays the recording sequence of the unrecorded track group SP(1) in this case and increments the variable ER by one.

When the discrimination result in the step S95 is YES or after the step S97 is carried out, the step S98 discriminates whether or not the variable I (I=1 in this case) is equal to n. When the discrimination result in the step S98 is NO, there still remains one or more unrecorded track groups which need to be scanned, and a step S99 increments the variable I by one before returning the operation to the step S91.

When the steps S91 through S99 are carried out for all of the remaining unrecorded track groups starting from the unrecorded track group SP(2) and the discrimination to determine whether or not all of the tracks in each unrecorded track group are indeed unrecorded tracks is finished, the discrimination result in the step S98 becomes YES and the operation is ended. The operation described heretofore is often referred to as a rehearsal process which is carried out before the actual program recording is started.

Therefore, according to the present embodiment, it is possible to discriminate before the actual program recording is started whether or not the unrecorded track groups in which the information signal is to be recorded partially overlap, and also, whether or not one or more pre-recorded tracks actually exist within the unrecorded track group. An error is displayed to warn the user when there is partial overlap of the unrecorded track groups or one or more pre-recorded tracks actually exist within the unrecorded track group, so as to prevent the duplex recording.

The processing sequence of the present embodiment is not limited to that described heretofore. For example, the process shown in FIG. 13B may be carried out before the process shown in FIG. 13A, except for the step S81 which must be carried out first. In addition, the address signal may be recorded in pits of a guide track formed on the disc or recorded in a groove pre-formed on the disc. It is not essential that the address signal is recorded in the form of pits.

The information recording medium used in the present invention is not limited to the optical disc used in the embodiments described heretofore. For example, the present invention is also applicable to information recording mediums such as a tape and a card, and also to magnetic information recording mediums. Moreover, the information signal recorded on the information recording medium is not limited to the video signal, and other information signals such as a digital signal (digital data) may be recorded on the information recording disc.

Further, the present invention is not limited to these embodiments, but various variations and modifications may be made without departing from the scope of the present invention.

What is claimed is:

1. A method of automatically searching a desired track position on an information recording medium comprising pre-recorded tracks and unrecorded tracks based on the existence and non-existence of a reproduced radio frequency signal reproduced from the information recording medium by reproducing means which scans the information recording medium, said pre-recorded tracks being pre-recorded with an information signal, said method comprising the steps of:

successively feeding the reproducing means responsive to an input track position search instruction one track pitch in a direction in accordance with the input track position search instruction;

detecting the existence and non-existence of a reproduced radio frequency signal obtained from the reproducing means for each track on the information recording medium; and stopping the feeding of the reproducing means at a first track where an existence state of the reproduced radio frequency signal changes from an existence state of the reproduced radio frequency signal for a track which is scanned by the reproducing means at a time when the input track position search instruction is entered, said first track being scanned repeatedly by the reproducing means, said existence state indicating the existence or non-existence of the reproduced radio frequency signal.

2. A method as claimed in claim 1 in which said information recording medium is a disc, and said step of successively feeding the reproducing means feeds the reproducing means one track pitch in a radial direction of said disc in accordance with the input track position search instruction.

3. A method as claimed in claim 1 in which said step of stopping the feeding of the reproducing means stops the feeding of the reproducing means at a first unrecorded track when the reproducing means scans a certain pre-recorded track at the time when the input track position search instruction is entered and stops the feeding of the reproducing means at a first pre-recorded track when the reproducing means scans a certain unrecorded track at the time when the input track position search instruction is entered, said first unrecorded track being a first unrecorded track which occurs after said certain pre-recorded track, said first pre-recorded track being a first pre-recorded track which occurs after said certain unrecorded track.

4. A method of automatically searching a desired recording region on an information recording medium comprising pre-recorded tracks and unrecorded tracks based on the existence and non-existence of a reproduced radio frequency signal reproduced from the information recording medium by reproducing means which scans the information recording medium, said pre-recorded tracks being pre-recorded with an information signal, said method comprising the steps of:

storing a desired recording interval in which an information signal is to be recorded;

successively feeding the reproducing means one track pitch in a forward direction;

detecting the existence and non-existence of a reproduced radio frequency signal obtained from the reproducing means for each track;

feeding the reproducing means in a reverse direction when a group of unrecorded tracks comprising a number of unrecorded tracks greater than or equal to a number of tracks required to record the information signal amounting to the desired recording interval is detected in said step of detecting the existence and non-existence of the reproduced radio frequency signal so as to search for a starting track of the detected group of unrecorded tracks; and confirming an address of the starting track.

5. A method as claimed in claim 4 in which said information recording medium is a disc, and said step of confirming the address of the starting track confirms the address of the starting track of the detected group of unrecorded tracks based on an address signal which is pre-recorded on the pre-recorded tracks and is reproduced by the reproducing means, said address signal indicating an address on said disc.

6. A method as claimed in claim 4 in which said information recording medium is a disc comprising a guide track for guiding the reproducing means pre-formed thereon, and said step of confirming the address of the starting track confirms the address of the starting track of the detected group of unrecorded tracks based on an address signal which is pre-recorded on the guide track and is reproduced by the reproducing means, said address signal indicating an address on said disc.

7. A method of automatically searching groups of unrecorded tracks on an information recording medium comprising pre-recorded tracks and unrecorded tracks based on the existence and non-existence of a reproduced radio frequency signal reproduced from the information recording medium by reproducing means which scans the information recording medium, said pre-recorded tracks being pre-recorded with an information signal, said groups of unrecorded tracks being used to record an information signal amounting to a desired recording interval in a program recording mode, said groups of unrecorded tracks respectively having starting and ending addresses which are entered before a start of the program recording mode, said method comprising:

a first step of comparing an ending address of one group of unrecorded tracks having a smallest starting address and a starting address of another group of unrecorded tracks having a next smallest starting address to confirm that the ending address of said one group of unrecorded tracks is smaller than the starting address of said other group of unrecorded tracks for all of said groups of unrecorded tracks; and a second step of successively feeding the reproducing means one track pitch in a scanning direction and detecting the existence and non-existence of a reproduced radio frequency signal obtained from the reproducing means for each track in all of said groups of unrecorded tracks, said first and second steps confirming the starting and ending addresses of each group of unrecorded tracks and confirming that each group of unrecorded tracks comprises solely of unrecorded tracks by detecting that no reproduced radio frequency signal is obtained from tracks of each group of unrecorded tracks before the start of the program recording mode.

8. A method as claimed in claim 7 which further comprises a third step of sequentially assigning numbers 1 through n to each of the groups of unrecorded tracks starting from a group of unrecorded tracks having a smallest starting address, said first step comparing an ending address of an Ith group of unrecorded tracks and a starting address of a (I+1)th group of unrecorded tracks for I=1, ..., n−1.

9. A method as claimed in claim 7 which further comprises a third step of detecting an error in starting and ending addresses of first and second predetermined groups of unrecorded tracks when said first step detects that an ending address of said first predetermined group of unrecorded tracks having a smallest starting address is greater than a starting address of said second predetermined group of unrecorded tracks having a next smallest starting address.

10. A method as claimed in claim 7 which further comprises a third step of detecting an error in a predetermined group of unrecorded tracks when said second step detects the existence of a reproduced radio frequency signal from at least one of the tracks of said predetermined group of unrecorded tracks.

11. An apparatus for automatically searching a desired track position on an information recording medium comprising pre-recorded tracks and unrecorded tracks based on the existence and non-existence of a reproduced radio frequency signal reproduced from the information recording medium, said pre-recorded tracks being pre-recorded with an information signal, said apparatus comprising:

reproducing means for scanning the tracks of said information recording medium;

feeding means for feeding said reproducing means in a predetermined scanning direction responsive to a control signal;

detecting means for detecting the existence and non-existence of a reproduced radio frequency signal from said reproducing means for each track on said information recording medium and for producing an output indicative of an existence state of the detected reproduced radio frequency signal for each track; and control means responsive to an input track position search instruction for supplying to said feeding means a control signal for successively feeding said reproducing means one track pitch in the scanning direction in accordance with said input track position search instruction, and for supplying to said feeding means a control signal for stopping the feeding of said reproducing means at a first track where the existence state of the reproduced radio frequency signal indicated by the output of said detecting means changes from the existence state of the reproduced radio frequency signal for a track which is scanned by said reproducing means at a time when said track position search instruction is received, said first track being scanned repeatedly by said reproducing means.

* * * * *